United States Patent
Hedges et al.

(10) Patent No.: US 11,971,700 B2
(45) Date of Patent: Apr. 30, 2024

(54) METHOD FOR AUTOMATED PRODUCTION OF 3D ELECTRONIC COMPONENTS USING CAD/CAM DEVICE

(71) Applicant: NEOTECH AMT GMBH, Nuremberg (DE)

(72) Inventors: Martin Hedges, Nuremberg (DE); Johannes Hörber, Heilsbronn (DE)

(73) Assignee: NEOTECH AMT GMBH, Nuremberg (DE)

( * ) Notice: Subject to any disclaimer, the term of this patent is extended or adjusted under 35 U.S.C. 154(b) by 493 days.

(21) Appl. No.: 17/283,308

(22) PCT Filed: Sep. 16, 2019

(86) PCT No.: PCT/EP2019/074722
§ 371 (c)(1),
(2) Date: Apr. 7, 2021

(87) PCT Pub. No.: WO2020/074215
PCT Pub. Date: Apr. 16, 2020

(65) Prior Publication Data
US 2021/0389749 A1    Dec. 16, 2021

(30) Foreign Application Priority Data
Oct. 11, 2018 (DE) .................. 10 2018 125 216.1

(51) Int. Cl.
*G05B 19/4099* (2006.01)
*B33Y 50/00* (2015.01)
*H05K 1/18* (2006.01)

(52) U.S. Cl.
CPC .......... *G05B 19/4099* (2013.01); *B33Y 50/00* (2014.12); *G05B 2219/49023* (2013.01); *H05K 1/181* (2013.01)

(58) Field of Classification Search
CPC ...... G05B 19/4099; G05B 2219/49023; B33Y 50/00; H05K 1/181; H05K 3/0014; H05K 3/1241; G06F 2113/10; G06F 30/30
See application file for complete search history.

(56) References Cited

U.S. PATENT DOCUMENTS 5,321,885 A * 6/1994 Hino .................. B23P 21/004
29/33 P
6,245,634 B1 * 6/2001 Or-Bach ................. G06F 30/30
438/462

(Continued)

OTHER PUBLICATIONS

English Translation of the Written Opinion of the International Searching Authority, dated Apr. 11, 2021.*

(Continued)

*Primary Examiner* — Ramesh B Patel
(74) *Attorney, Agent, or Firm* — LUCAS & MERCANTI, LLP; Klaus P. Stoffel

(57) ABSTRACT

A method for preparing the automated production of an electronic component by 3D printing, in which at least one of an SMD component and a conductor track are arranged on a substrate. Structural information describing the structure of the electronic component is used to determine first production information including a first machine-readable control command set for a production device for 3D printing. Together with the first control command set, post-processing information is determined from the structural and production information, which includes recycling information including a second, machine-readable control command set for a recycling device for at least partial automated recycling of the electronic component by recovery of at least one material of the electronic component and repair information including a third machine-readable control command set for a repair device for at least partial automatic repair of (Continued)

the electronic component, and is reserved for post-processing and repair of the electronic component.

16 Claims, 2 Drawing Sheets

(56) References Cited

U.S. PATENT DOCUMENTS

| | | | | |
|---|---|---|---|---|
| 8,290,239 B2* | 10/2012 | Noy | | H05K 3/225 |
| | | | | 382/141 |
| 9,956,655 B2* | 5/2018 | Yamamoto | | G05B 19/41805 |
| 10,705,135 B2* | 7/2020 | Lussier | | G05B 19/4099 |
| 10,960,966 B2* | 3/2021 | Ischdonat | | B64C 1/066 |
| 2006/0190918 A1* | 8/2006 | Edwards | | H01L 23/5382 |
| | | | | 716/137 |
| 2007/0092128 A1* | 4/2007 | Noy | | H05K 3/225 |
| | | | | 382/145 |
| 2007/0299553 A1* | 12/2007 | Elhanan | | G06F 30/30 |
| | | | | 700/121 |
| 2008/0082949 A1* | 4/2008 | Schwartz | | H05K 13/0084 |
| | | | | 716/132 |
| 2009/0199141 A1* | 8/2009 | Noujeim | | G06F 30/30 |
| | | | | 716/106 |
| 2009/0321511 A1* | 12/2009 | Browne | | H01M 10/54 |
| | | | | 705/308 |
| 2014/0134333 A1* | 5/2014 | Hedges | | B05C 5/002 |
| | | | | 427/256 |
| 2016/0324006 A1* | 11/2016 | Vetter | | G06F 30/39 |
| 2016/0335708 A1* | 11/2016 | Delvecchio | | G06Q 30/0635 |
| 2017/0042031 A1* | 2/2017 | Robin | | B33Y 80/00 |
| 2018/0118323 A1* | 5/2018 | Ischdonat | | B32B 37/14 |
| 2020/0093000 A1* | 3/2020 | Suzuki | | B33Y 10/00 |
| 2020/0143334 A1* | 5/2020 | Kayara | | G06Q 10/087 |
| 2021/0379826 A1* | 12/2021 | Hedges | | B29C 64/182 |
| 2021/0389749 A1* | 12/2021 | Hedges | | G06F 30/30 |
| 2022/0348363 A1* | 11/2022 | Colson | | B33Y 50/02 |

OTHER PUBLICATIONS

Martin Hedges: "3D Printed Electronics Process—Enabling Novel Applications and Mass Production", Dec. 17, 2015 (Dec. 17, 2015), XP055650340, Found in Internet: URL:http://www.3dprintingelectronicsconference.com/wp-content/uploads/2016/01/Martin-Hedges.pdf [found on Dec. 6, 2019] p. 8 p. 20.

Swee M Mok et al: "Modeling Automatic Assembly and Disassembly Operations for Virtual Manufacturing", IEEE Transactions on Systems, Man and Cybernetics. Part A: Systems and Humans, IEEE Service Center, Piscataway, NJ, US, Bd. 31, Nr. 3, May 1, 2001 (May 1, 2001), XP011056391, ISSN: 1083-4427, pp. 224-227.

* cited by examiner

METHOD FOR AUTOMATED PRODUCTION OF 3D ELECTRONIC COMPONENTS USING CAD/CAM DEVICE

CROSS-REFERENCE TO RELATED APPLICATIONS

The present application is a 371 of International application PCT/EP2019/074722, filed Sep. 16, 2019, which claims priority of DE 10 2018 125 216.1, filed Oct. 11, 2018, the priority of these applications is hereby claimed and these applications are incorporated herein by reference.

BACKGROUND OF THE INVENTION

The invention relates to a method for preparing the automated production of an electronic component, in which at least one SMD component part and/or at least one conductor track and/or at least one plug component and/or at least one printed electronic component part is/are arranged on at least one substrate, for manufacture by means of 3-D printing, wherein an item of structural information which describes the structure of the electronic component part and is created, in particular, using a CAD and/or CAM device is used to determine an item of production information comprising a first machine-readable control instruction set for a production device at least partially designed for 3-D printing. In addition, the invention relates to a method for automated production and/or for automated recycling and/or for automatic repair of an electronic component, to a computing device, to a computer program and to an electronically readable data storage device.

Electronic components as functional units which ultimately provide at least one electronic circuit providing at least one function have already been known, in principle, for a long time in the prior art. In this case, a printed circuit board (PCB) or a circuit board produced in conventional metallization methods is usually used as the substrate for conductor tracks and electronic component parts for the purpose of producing an electronic component in a conventional manner, to which circuit board the conductor tracks have been or are applied and are connected to the electronic component parts by means of soldering, in particular. Recent production variants for electronic components relate to the use of production devices which are designed for additive manufacturing, for example by means of printing technologies. In this case, it is also possible to use other substrates, for example plastic substrates, glass fiber substrates, carbon fiber substrates, wooden panel substrates, which are possibly coated, and the like. Conductor tracks, for example made of silver or copper, are applied, by means of 3-D printing, to the substrate which has any desired form, in particular, and/or is itself 3-D printed, after which the electronic component parts in the form of SMD component parts (SMD—Surface-Mounted Device) can be added, for example by means of a pick-and-place method, in particular using conductive adhesive. Electronic component parts can also be printed, for example in the form of a printed resistor, a printed capacitor and/or a printed diode. In this case, it is also possible to embed conductor tracks and/or other component parts, in particular. The use of 3-D printing to produce electronic components not only provides a large number of advantages in terms of manufacturing, but also increases, in particular, the flexibility and diversity of electronic components which can be produced, since electronic circuits, for example, can also be directly applied to components used elsewhere, for example to injection-molded structural component parts or composite panels in the case of motor vehicles.

Since the 3-D printing of electronic components usually uses a production device comprising a movement mechanism which can be used to move various production tools, for example, for 3-D printing, piezo tools, tools for aerosol-based 3-D printing, ink jetting tools, dispensing tools and/or FDM tools and/or, for the other processing of the materials, surface treatment tools, plasma cleaning tools, sintering tools (light/laser), a UV curing tools and/or the like, extremely extensive, in particular complete, automation of the production process can be achieved. In this case, CAD (Computer-Aided Design) and/or CAM (Computer-Aided Manufacturing) can be used to generate, as production information, control instruction sets for the production device which can be directly implemented inside a control device of the production device. Whereas it is fundamentally conceivable in this case to carry out manual programming in order to obtain the first control instruction set of the production information, for example in a machine-readable programming language, it is common practice to program the control instruction set by machine, to be precise on the basis of an item of structural information which, for example, uses appropriate algorithms to convert a 3-D model of the electronic component into the machine-understandable control instruction set which can be used directly in the control device of the production device. Such machine programming therefore starts from CAD and generates a control instruction set suitable for CAM. Computing devices, which can also be referred to as CAD and/or CAM devices, can be used for this purpose. A programming language which can be used by way of example is the G-code according to the DIN With the increasing use of electronic components in a wide variety of everyday and industrial devices, the amount of electronic waste (e-waste) also increases. Electronics recycling (e-waste recycling), that is to say the reuse and reprocessing of any type of electrical and electronic material after the end of the service life of the electronic component, is becoming increasingly important. However, current recycling methods are complex and labor-intensive and produce a large amount of waste which can no longer be reused. In this case, known recycling methods from the prior art usually involve dismantling the product, in which case this dismantling can be carried out manually, but may also include a type of "grinding" or the like, for example. For example, it is known practice to first of all dismantle a product and to manually sort the subsystems of which the product is composed. In a labor-intensive second step, the subsystems are also, in particular at least partially manually, dismantled. The e-waste items are dismantled in order to recover all parts and are then categorized as main materials and components. The items which have been dismantled are then divided according to individual parts which can be reused and those which are processed further in recycling. The items which cannot be efficiently dismantled and/or contain a mixture of materials, for example a remaining PCB which can be composed of resins, glass fibers, copper, nickel, gold, tin, aluminum, soldering agents and other materials, are then shredded, possibly together with other products from the dismantling, in which case material separation methods can be applied to the resulting microparts in order to separate and, in particular, individually recover the materials. A magnet arranged above a conveyor belt can first of all be used, for example, to remove magnetic materials, comprising steel and iron, from the microparts. A further step may be the separation of metallic and non-metallic components, in which case the metals can then either be sold or used to produce new electronic components. In an exemplary final step, plastic material can be separated from glass materials using water. Overall, there is therefore an extremely complicated and protracted process in order to be able to reuse materials of electronic components or products containing them.

A further problem when using modern manufacturing technologies, in particular 3-D printing, is the improved integration of the materials and component parts there. Configurations in which conductor tracks and/or component parts, for example printed electronic component parts, are embedded and are not visible/detectable from the outside are known, for example. This again considerably hampers recycling and/or repair in future.

SUMMARY OF THE INVENTION

Therefore, the invention is based on the object of specifying a possibility for the improved post-processing of electronic components, in particular for their recycling.

In order to achieve this object, provision is made according to the invention, in a method of the type mentioned at the outset, for an item of post-processing information to be determined, together with the first control instruction set, from the structural information and/or the production information, which post-processing information comprises an item of recycling information comprising a second machine-readable control instruction set for a recycling device, designed for the at least partially, in particular completely, automated recycling of the electronic component, for recycling the electronic component by recovering at least one material of the electronic component and/or an item of repair information comprising a third machine-readable control instruction set for a repair device designed to at least partially automatically repair the electronic component, and for the post-processing information to be held for the post-processing, in particular the recycling and/or the repair, of the electronic component.

According to the present invention, it has been recognized that the possibility of simplifying and reducing the complexity of electronics recycling exists for at least partially 3-D printed electronic components ("Printed Electronics" (PE)) by virtue of the recycling (or generally post-processing) being linked to the original production in order to achieve a high level of automation which is cost-effective, environmentally friendly and reduces complexity and also results in the materials being able to be recovered with extreme precision and with low losses. In addition, the number of materials used in the electronic component is reduced anyway in 3-D printing, at least in comparison with conventional PCB-based electronic components, which may result in further simplification. The idea is now that the structural information and/or, in particular, also the production information already contains important details of where which materials are present on or in the electronic component and how these materials are applied, which details, with knowledge of the properties of the recycling device to be used, therefore cannot only be used to create a first control instruction set for a production device by means of physical and technical automated analysis, but also to create at least one further control instruction set for the post-processing, in particular the recycling, in order to automate and optimize the latter and to adjust it to the special properties of the electronic component.

In this case, as explained at the outset, a machine-readable control instruction set should be understood as meaning the fact that it can be directly converted, by a control device of the production device or recycling device/repair device, into appropriate actuation of the components of the respective device. For this purpose, the control instruction set is preferably determined in a programming language ("machine code"), for example in G-code.

In this case, the production of electronic components by means of 3-D printing can be carried out on any desired two-dimensional or preferably three-dimensional surfaces of the substrate of the electronic component, wherein the substrate constitutes a mechanical structure, for example a board, a film or a three-dimensionally molded component part, in which case composite mechanical structures are also conceivable. In particular, the substrate (that is to say the carrier) itself can also be at least partially created by means of 3-D printing. Alternatively, the mechanical structure or the substrate can also be produced overall by means of conventional production methods. Circuits can be applied by means of a plurality of methods, for example ink jetting, aerosol jetting, dispensing and the like. SMD component parts, for example chips, sensors, LEDs, resistors, capacitors, connectors, battery holders and the like, can already be applied before the printing of the conductor tracks, together with the printing of the conductor tracks or after the printing of the conductor tracks, in particular using conductive adhesives, but soldering, wire-bonding and/or other suitable methods are also conceivable. The at least one print material and/or at least one fastening material for the SMDs is cured or sintered using suitable methods, for example by means of heat, light and/or laser.

The production of "Printed Electronics", that is to say such electronic components, using 3-D printing is digitally driven, as described. The printing of the conductor tracks and the application of the SMD component parts and pre-processing and post-processing steps are performed by means of first control instruction sets, that is to say machine code. In this case, in one preferred embodiment, an in particular three-dimensional CAD model of the electronic component can be used as the structural information and therefore the starting point. The production steps (3-D printing, SMD application, pre-processing and/or post-processing steps) are then programmed using suitable CAD/CAM software of a computing device, in particular of a CAD and/or CAM device, in particular by creating processing paths for tools. The machine code of the first control instruction sets informs the production device of how the corresponding production steps should be carried out in order to produce the electronic component.

The first control instruction set is executed inside the production device and the corresponding production steps are carried out in an automated manner.

Against this background, the invention now proposes, when determining the production information, to simultaneously also establish a link to the recycling by also determining an item of post-processing information, in particular comprising an item of recycling information or in the form of an item of recycling information. If, for example, a CAM post-processor or another computing unit is used to generate the production information with the first control instruction set, a second control instruction set, that is to say a second machine code, and/or a third control instruction set relating to dismantling and/or repair measures for the electronic component to be produced is/are generated at the same time. The corresponding post-processing information is held, that is to say stored, until it is required. If the electronic component is then decommissioned or becomes obsolete, for example, the recycling information in the post-processing information can be used directly, that is to say directly evaluated by the recycling device, in order to dismantle the electronic component into recyclable material and/or directly reusable component parts in at least partially automatic manner.

In this case, it has been determined that the knowledge of the structure and the production of the electronic component, which is generated while preparing the production of the electronic component, cannot only be usefully used with respect to a link to the recycling, but also with respect to repair measures which possibly need to be carried out. If SMD component parts, for example, are intended to be replaced, it is possible to generate appropriate and likewise directly machine-usable third control instruction sets which can approach the position of the SMD component part in a targeted manner, for example, and can replace it by means of suitable tools without localization, identification and the like being required for the repair. Conductor tracks which are possibly interrupted may be "bridged" on the basis of processing paths, which are also present in the third control instruction set, and can therefore be newly connected. In this case, as is fundamentally known, the fault is, for example, first of all determined, for example detected and identified. For respective faults, the third control instruction set may contain different sub-instruction sets which can repair the corresponding fault without localization, identification etc. then also being required. A link to repair measures is therefore also advantageously possible.

It shall also be noted at this point that the recycling information, in particular, may also contain further partial information in addition to the second control instruction set, for example a retrievable list of materials and/or SMD component parts used and the like. This makes it possible to preplan material extraction and/or recovery of component parts, for example. It shall also be noted that the recycling information can naturally also be used to dismantle products with production defects again ("reverse manufacture").

The present invention therefore makes it possible to achieve a large number of advantages. On the one hand, a high level of automation, and therefore a reduction in manual steps when recycling electronic components, is possible. Knowledge of the structure and/or production is subjected to physical/technical analysis and is used to generate control instruction sets which can be directly used in a recycling device (or repair device) and are held for the appropriate situation. This also enables, in particular, more accurate and more efficient recycling, with the result that a larger proportion of the materials used can be recovered or reused.

One preferred configuration of the present invention may provide for the post-processing information to be held in a storage means of the electronic component after the electronic component has been produced. This means that the post-processing information is held directly with the electronic component in the latter, in which case one particularly preferred configuration of the present invention may provide for the recycling device to automatically read the recycling information and/or for the repair device to automatically read the repair information from the storage means. The storage means may then be one of various types of storage devices, in particular storage devices which can be directly electronically read by a corresponding machine, for example based on RFID technology. This enables particularly simple recycling/particularly simple repair without there having to be direct contact with the producer of the electronic component. If the electronic component is available for recycling, the post-processing information, in particular the second control instruction set, is read in by the recycling device and can be directly used to recycle the electronic component, which further considerably reduces the amount of effort and is conducive to proper recycling of electronic components and environmental protection even when the producer is no longer available, for example.

Alternatively or additionally, provision may naturally also be made for the post-processing information to be held retrievably on a server device belonging to the producer of the electronic component. For example, for all types of electronic components offered by a producer, the corresponding post-processing information can be retrievably provided on a server device, in particular the Internet, for example on a corresponding website and/or a database which can also be directly addressed, in particular, by the recycling device and/or the repair device.

Generally speaking, the recycling information, in particular the second control instruction set, can describe a recycling measure to be performed and/or omitted and/or a sequence of recycling measures to be used and/or at least one operating parameter of at least one recycling measure and/or a recycling material to be used, in particular a release agent, and/or a recycling tool to be used. Knowledge of the structure or the production of the electronic component can therefore be directly converted into specific custom-fit machine instructions for the recycling device in order to allow reuse/recovery which is as extensive as possible by selecting appropriate recycling measures and suitably parameterizing them in a suitable sequence.

In this case, it is particularly advantageous within the scope of the present invention if the production device and the recycling device are assumed to be structurally identical for the purpose of determining the recycling information. As already mentioned, a production device for producing electronic components using 3-D printing may comprise, in particular, on the one hand, a movement mechanism and, on the other hand, at least one production tool, in particular at least one printing tool and/or at least one placement tool for SMD component parts and/or at least one pre-processing and/or post-processing tool, for example a curing and/or sintering tool. Within the scope of the present invention, it has now been recognized that it may be particularly advantageous to use a structurally identical machine as the recycling device by replacing at least some of the production tools with corresponding recycling tools. In particular, a completely identical device may also be used as the production device and recycling device. This has the advantage, in particular, that processing paths and the like may be created in the same control instruction framework and/or coordinate system. In such a configuration, production devices used originally for production can be reused in a particularly advantageous manner, even in the case of further developments, in order to recycle the electronic components produced by said devices at the end of their service life and/or to carry out repair measures. Although new production devices having greater accuracy are provided, for example, the old production devices can nevertheless be used further to recycle (in particular older) electronic components.

In a specific advantageous development of the invention, provision may be made for both the production device and the recycling device to be designed to move at least one tool relative to the electronic component along processing paths described by the control instruction sets of the production information and the recycling information, wherein at least one processing path, in particular all processing paths, in the production information and the recycling information is/are selected to be identical. This is advantageous, in particular, when the production device and the recycling device have the same movement mechanism anyway. If a conductor track is then applied along a particular processing path, for example, it is possible to move along the same processing path again at a later time using an accordingly provided recycling tool in order to effectively remove the conductor track again. For example, it is conceivable to use a milling head and/or a recycling tool discharging a release agent for the purpose of removing a conductor track and/or another applied material. For example, conductor tracks can be stripped off by means of an acid and can be removed by means of a suction process. In this case, a printing head as the production tool is therefore replaced with a milling head and/or a release agent discharge tool as the recycling tool if the printing head also cannot be used anyway to dispense the release agent. However, in addition to conductor tracks, processing paths as tracks of tools may also be important, both for the production information and for the recycling information or the corresponding control instruction sets. For example, processing paths, along which SMD component parts are placed using a pick-and-place method, can be reused to approach the corresponding positions of the SMD component parts and to dispense, for example, a solvent for an adhesive used as a release agent, with the result that the SMD component part can be removed and can possibly even be reused.

In the case of identical processing paths, provision may therefore be made for at least partially different tools to be used by the production device and the recycling device and/or for at least one of the at least one identical processing path to relate to the course of a conductor track to be 3-D printed.

In particular in the case of assumed lower accuracy of the recycling device, one advantageous development of the present invention may also provide for the processing width along at least one of the at least one identical processing path to be selected to be larger for the recycling device than for the production device. In this manner, older production devices, for example, which have lower processing accuracy can be reused as recycling devices since the highest accuracy is not important in recycling, but rather the recycling result, generally material and/or component part separation, is intended to be achieved mainly by the recycling measure. Tolerances which are accordingly present can be covered by a wide choice of the processing path. If, for example, a conductor track is intended to be stripped or milled off by means of a release agent, for example an acid, a greater processing width can be selected here since the release agent or the milling machine shows its effect only in the region of the actual conductor track anyway.

Another development of the present invention may provide for at least one adjustment of the production information, which improves the recyclability of the electronic component to be carried out at least by evaluating the recycling information and for updated recycling information to be accordingly newly determined on the basis of the adjusted production information. This means that, if less complex and/or more efficient recycling is intended to be achieved, a type of iterative improvement can take place by determining improvement approaches, for example, during recycling on the basis of the currently determined recycling information and feeding them back into the determination of the production information which may possibly in turn influence the recycling information which should be newly determined in such a case. A further improvement in the recycling efficiency and/or environmental compatibility of electronic components is therefore possible.

In addition to the method for preparing production, the present invention also relates to a method for the automated production and/or the automated recycling and/or the automated repair of an electronic component, which method is distinguished by the fact that an item of production information and an item of post-processing information are determined by means of the method described above, and the electronic component is produced in an at least partially, preferably completely, automated manner by means of the production device executing the first control instruction set and/or is recycled by means of the recycling device executing the second control instruction set and/or is repaired by means of the repair device executing the third control instruction set. All statements relating to the preparation method can be similarly applied to the production and/or recycling and/or repair method, with the result that the advantages which have already been mentioned can hereby likewise be achieved.

As already explained, it may be preferred in this case for the post-processing information to be stored in a storage means of the electronic component during automated production. Furthermore, it is particularly expedient if the production device and the recycling device which are used are structurally identical. This may moreover also apply to the repair device.

The invention also relates to a computing device which is designed to carry out a method according to the invention. Such a computing device may comprise, for example, on the one hand, a CAD and/or CAM device, by means of which the structural information is determined and can be converted into corresponding control instruction sets. The computing device may also have, in particular with respect to the production and/or recycling and/or repair method, at least one control device of the production device and/or at least one control device of the repair device which execute(s) appropriate control instruction sets intended for it/them. Specifically, the computing device may have, for example, a determination unit which is designed to determine the production information and the post-processing information using the structural information provided. Further functional units may be provided for further steps of the method according to the invention, in particular corresponding control units which execute the control instruction sets. The computing device has at least one processor and at least one storage means.

A computer program according to the invention can be loaded directly into at least one storage means of a computing device, for example, and has program means for carrying out the steps of a method described herein when the computer program is executed in the computing device. In this case, the computer program can preferably implement, on the hand, an algorithm which allows the common and substantially simultaneous determination of the production information and the post-processing information at the time of preparing the production, as described. In particular in the case of the production and/or recycling and/or repair method, the computer program may also have an interpreter for the control instruction sets in order to actuate components of the corresponding devices according to the control instruction sets.

The computer program may be stored on an electronically readable data storage device according to the invention which therefore has electronically readable control information which is stored thereon and comprises at least one computer program according to the invention and is configured such that it carries out a method according to the invention when the data storage device is used in a computing device. The data storage device may be a non-transient data storage device, for example a CD-ROM.

BRIEF DESCRIPTION OF THE DRAWING

Further advantages and details of the present invention emerge from the exemplary embodiments described below and on the basis of the drawings, in which.

DETAILED DESCRIPTION OF THE INVENTION

Figure 1:
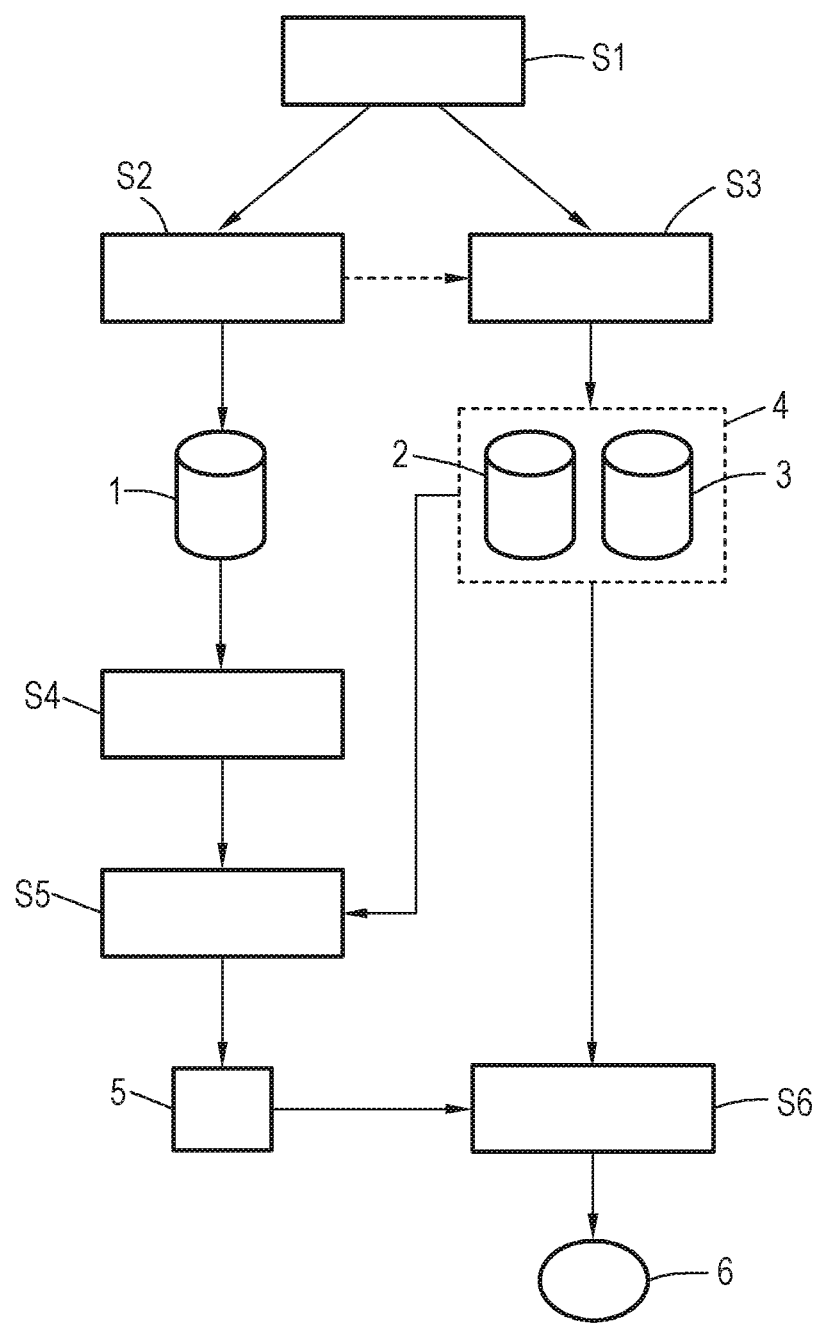
FIG. 1 shows a general flowchart of an exemplary embodiment of the method according to the invention.

FIG. 1 shows a general flowchart of an exemplary embodiment of the method according to the invention. Both the production and the recycling of an at least partially 3-D printed electronic component are intended to be included here, wherein the electronic component has at least one conductor track and at least one SMD component part which are arranged on a substrate, in particular a three-dimensional substrate. Plastic, glass fiber, carbon fiber and/or coated wood can be used as the substrate material, for example. Conductor tracks, for example made of silver or copper, may be applied. SMD component parts may comprise, for example, chips, capacitors, resistors, inductances, switches, plug components and the like. The electronic component may also have printed electronic component parts, for example printed resistors, capacitors and the like.

In a step S1 of the method, an item of structural information is first of all provided, for example in the form of a three-dimensional model of the electronic component to be produced, which model is created in a CAD process. In a step S2, production information, which comprises a first control instruction set 1 in machine code, for example G-code, can then be automatically derived using this structural information. The first control instruction set 1 may be directly executed by the production device, specifically a control device of the production device, in order to produce the electronic component in a completely automated manner in this case and in an at least partially automated manner in other cases.

For this purpose, the production device may have a movement mechanism and at least one production tool, in the present case at least one 3-D printing tool, at least one placement tool (pick-and-place tool) for SMD component parts and at least one pre-processing and/or post-processing tool. The production tools are moved in a highly accurate manner by means of the movement mechanism, for example a 3-D printing tool in order to be able to apply a conductor track along a processing path, or a placement tool in order to fasten an SMD component part in an accurate position by means of a conductive adhesive which can be initially positioned using a different tool or the same tool.

For step S3 which is discussed below, it is now assumed that a repair device to be used for repair and a recycling device to be used for recycling are at least substantially structurally identical to the effect that there is likewise a movement mechanism which moves corresponding tools. At least the recycling device and the production device may preferably be completely structurally identical with at least partially interchangeable tools. In particular, the recycling of the electronic component and the production of the electronic component can therefore be carried out using the same machine, that is to say device.

In a step S3, in precisely this preparation phase of the production, substantially together with step S2, wherein parts of the production information can also be taken into account, at least one second control instruction set 2 for the recycling device and/or at least one third control instruction set 3 for the repair device are also determined as post-processing information 4 on the basis of the structural information, wherein the third control instruction set 3 to be interpreted as repair information can be considered to be optional. The important factor is the determination of the second control instruction set 2 to be interpreted as recycling information.

During this determination in step S3, the structural information is always used, but specifically also the production information in this case, since the processing paths used in the control instruction set 1 can ultimately be directly applied to the second control instruction set 2 and possibly the third control instruction set 3 with regard to the executing devices being structurally identical. For example, provision may therefore be made for a conductor track to be applied by means of a printing tool during production according to the first control instruction set 1 and for the same processing path to be moved along during recycling according to the second control instruction set 2 in order to remove the conductor track again by means of a corresponding recycling tool, for example a milling tool and/or a recycling tool which discharges and/or aspirates a release agent. Similarly, SMD component parts which were positioned at particular positions according to the first control instruction set can be approached again in a positionally accurate manner according to the second control instruction set, for example, and can be removed again, in particular again by means of the pick-and-place tool or the placement tool. For the third control instruction set 3 of the repair information, if it is determined, it may hold true that corresponding replacement instructions for SMD component parts and/or reprinting instructions for conductor tracks are included.

The processing width, for example when removing conductor tracks, is expediently selected to be wider at least for the recycling operation, that is to say the second control instruction set 2, in order to compensate for any positional inaccuracies as far as possible and to make it possible to recover the conductor track material (and the substrate remaining underneath) as completely as possible.

It shall be noted at this point that mutual feedback between steps S2 and S3 is also possible, for example in order to improve the recycling process in step S3 with regard to particularly high environmental compatibility, with the result that the production information can be also adjusted for better recycling and the like, for example.

In a step S4, the electronic component is produced on the basis of the first control instruction set 1 or generally the production information by means of the production device, wherein 3-D printing is at least partially used. In a step S5, the post-processing information 4 is stored in a storage means of the produced electronic component in order to be held there. This storage means may be based, for example, on RFID technology, but may also be configured to be electronically readable via corresponding connections, for example a plug-in contact. At the same time, the post-processing information is held on a server device belonging to the producer of the electronic component if it is not possible to read the information from the storage means. The result of this production process is then the electronic component 5.

If the optional repair information has been determined in step S3, repair measures according to the third control instruction set 3 can be carried out in an automated manner during the service life of the electronic component 5.

If the end of the service life of the electronic component 5 has been reached or the electronic component becomes obsolete, the recycling by means of the recycling device is carried out in a step S6, which recycling device automatically reads the second control instruction set 2 from the storage means of the electronic component 5 and implements it within its control device in order to recover materials and parts of the electronic component 5 as the recycling result 6. SMD component parts can be reused, for example; materials can be supplied to a new production process and/or can be sold.

It shall again be noted here that the production device or a largely or completely structurally identical device can again be used as the recycling device, wherein obsolete production devices can also be operated further as recycling devices, in particular, since increased accuracy is not important when recycling older electronic components 5 and tolerances can be accordingly compensated for on account of the choice of wider processing paths, as explained.

Figure 2:
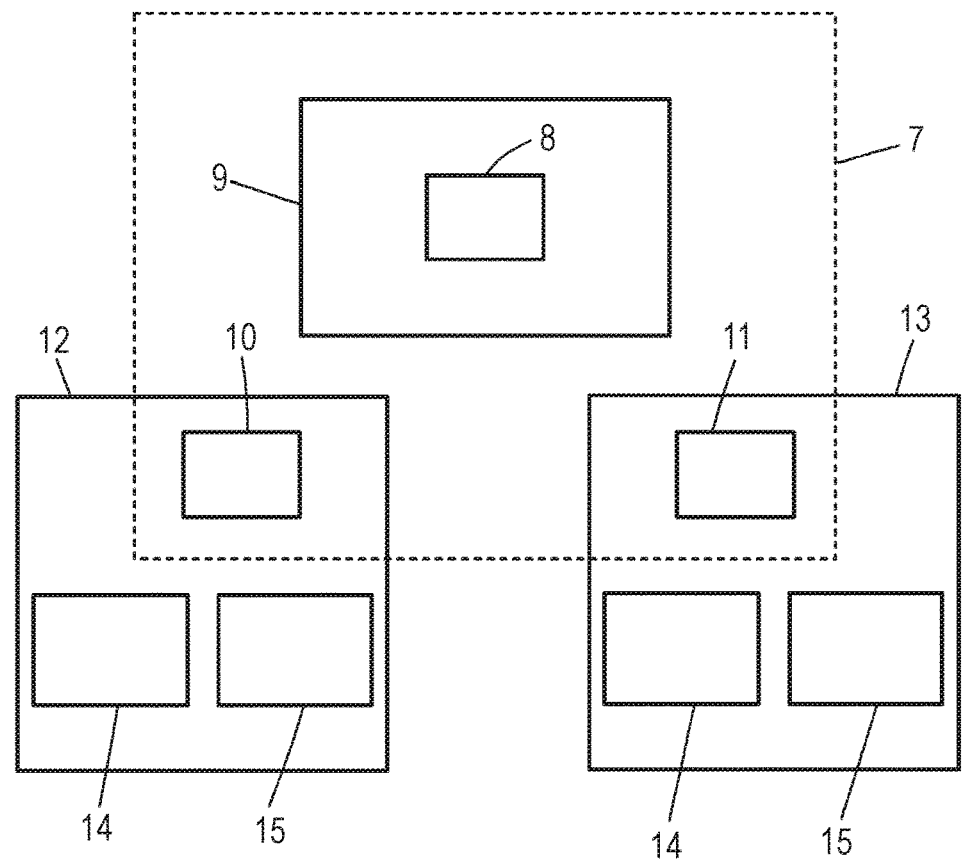
FIG. 2 shows the functional structure of a computing device according to the invention.

FIG. 2 shows a basic schematic diagram of a system in which the method according to the invention can be carried out. In this case, a computing device 7 for carrying out the exemplary embodiment shown in FIG. 1 initially comprises a determination unit 8 for carrying out steps S2 and S3, wherein the determination unit 8 is part of a CAD and CAM device 9. This may be, for example, a computer on which corresponding CAD/CAM software is present. The structural information can be determined by means of CAD in the at least partially manual design of the electronic component 5, for example, and can be made available to the determination unit 8 which uses it to derive the production information and the post-processing information 4, specifically the first control instruction set 1, the second control instruction set 2 and the third control instruction set 3, therefrom.

In the present case, the computing device 7 also comprises the control devices 10, 11 of the production device 12 and of the recycling device 13, respectively, wherein the invention is also already implemented merely by implementing steps S1, S2 and S3 using the determination unit 8.

Both the production device 12 and the recycling device 13 comprise, in particular, as components, a movement mechanism 14 and tools 15, as already explained, in which case further components may naturally also be provided. The control devices 10, 11 have an interpreter which makes it possible for them to convert control instruction sets 1, 2, 3 into direct actuation of their components and therefore to execute said control instruction sets.

Figure 3:
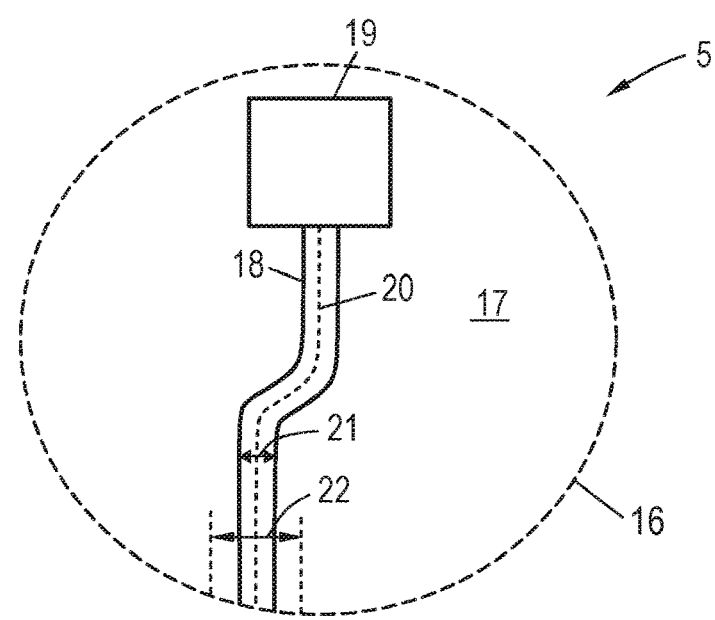
FIG. 3 shows a section of a surface of an electronic component with processing paths.

FIG. 3 finally shows a section 16 of an in particular three-dimensional surface 17 of an electronic component 5. A conductor track 18, for example made of silver, which ends at an SMD component part 19, for example an LED, can be seen, in particular. The conductor track 18 has been applied along the processing path 20 by means of a printing tool, wherein the processing width in the production process corresponds to the width 21 of the conductor track 18. For the recycling process, that is to say the second control instruction set 2, a larger processing width 22 is now selected in step S3, as indicated in the lower region of FIG. 3. This makes it possible to compensate for tolerances.

Processing paths may moreover also relate to the operation of approaching positions of SMD component parts 19 and/or the operation of applying and accordingly removing printed electronic component parts.

The invention claimed is:

1. A method for preparing automated production of an electronic component by 3-D printing, in which production at least one of: a surface mounted device (SMD) component part, a conductor path, a plug component, and a printed electronic component part is arranged on at least one substrate, the method comprising the steps of:
   creating an item of structural information that describes a structure of the electronic component part using a CAD and/or CAM device;
   using the item of structural information to determine an item of production information comprising a first machine-readable control instruction set for a production device at least partially designed for 3-D printing; and
   determining an item of post-processing information, together with the first control instruction set, from at least one of the structural information and the production information, wherein the post-processing information comprises at least one of: an item of recycling information comprising a second machine-readable control instruction set for a recycling device configured for automated recycling of the electronic component, for recycling the electronic component by recovering at least one material of the electronic component, and an item of repair information comprising a third machine-readable control instruction set for a repair device configured to at least partially automatically repair the electronic component, wherein the item of post-processing information is held for the post-processing of the electronic component.

2. The method according to claim 1, including holding the post processing information in a storage means of the electronic component after the electronic component has been produced.

3. The method according to claim 2, wherein at least one of: the recycling device automatically reads the recycling information from the storage means; and the repair device automatically reads the repair information from the storage means.

4. The method according to claim 1, including holding the post processing information retrievably on a server device belonging to a producer of the electronic component.

5. The method according to claim 1, wherein the recycling information describes at least one of a recycling measure to be performed or omitted, a sequence of recycling measures to be used, at least one operating parameter of at least one recycling measure, a recycling material to be used, and a recycling tool to be used.

6. The method according to claim 1, including assuming the production device and the recycling device to be structurally identical for purposes of determining the recycling information.

7. The method according to claim 1, wherein both the production device and the recycling device are designed to move at least one tool relative to the electronic component along processing paths described by the control instruction sets of the production information and the recycling information, wherein at least one of the processing paths in the production information and in the recycling information are selected to be identical.

8. The method according to claim 7, including using at least partially different tools by the production device and the recycling device in the identical processing paths.

9. The method according to claim 7, including selecting a processing width along the at least one identical processing path to be larger for the recycling device.

10. The method according to claim 7, wherein at least one of the at least one identical processing paths relates to the course of a conductor track to be 3-D printed.

11. A computing device designed to carry out a method according to claim 1.

12. A computer program which carries out the steps of a method according to claim 1 when it is executed on a computing device.

13. An electronically readable data storage device on which a computer program according to claim 12 is stored.

14. A method for at least one of automated production, automated recycling, and ire automated repair of an electronic component, comprising the steps of: determining an item of production information and an item of post-processing information using the method according to claim 1; and at least one of producing the electronic component in an at least partially automated manner by the production device executing the first control instruction set, recycling the electronic component by the recycling device executing the second control instruction set, and repairing the electronic component by the repair device executing the third control instruction set.

15. The method according to claim 14, including storing the post processing information in a storage means of the electronic component during automated production.

16. The method according to claim 14, wherein the production device and the recycling device are structurally identical.

* * * * *